United States Patent
Dhar et al.

(10) Patent No.: US 10,538,146 B2
(45) Date of Patent: Jan. 21, 2020

(54) REDUCING EXTERNALLY VARIABLE DISPLACEMENT COMPRESSOR (EVDC) START-UP DELAY

(71) Applicant: FORD GLOBAL TECHNOLOGIES, LLC, Dearborn, MI (US)

(72) Inventors: Debasish Dhar, Canton, MI (US); Manfred Koberstein, Troy, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 354 days.

(21) Appl. No.: 15/370,776

(22) Filed: Dec. 6, 2016

(65) Prior Publication Data
US 2018/0154737 A1    Jun. 7, 2018

(51) Int. Cl.
   *B60H 1/32*     (2006.01)
(52) U.S. Cl.
   CPC ... *B60H 1/3219* (2013.01); *B60H 2001/3255* (2013.01); *B60H 2001/3261* (2013.01); *B60H 2001/3263* (2013.01); *B60H 2001/3275* (2013.01)
(58) Field of Classification Search
   CPC .......... B60H 1/3219; B60H 2001/3275; B60H 1/3216; B60H 2001/3261
   See application file for complete search history.

(56) References Cited

U.S. PATENT DOCUMENTS

| | | | |
|---|---|---|---|
| 5,518,373 A | 5/1996 | Takagi et al. | |
| 5,785,502 A * | 7/1998 | Ota | F04B 27/1036 417/222.1 |
| 6,279,331 B1 * | 8/2001 | Hirota | B60H 1/00885 62/117 |
| 6,385,982 B1 * | 5/2002 | Ota | F04B 27/1804 62/209 |
| 6,434,956 B1 * | 8/2002 | Ota | B60H 1/3208 417/222.2 |
| 6,539,734 B1 | 4/2003 | Weyna | |
| 6,637,223 B2 | 10/2003 | Ota et al. | |
| 8,375,733 B2 * | 2/2013 | Preston | F25B 49/027 62/186 |
| 8,672,642 B2 | 3/2014 | Tolbert, Jr. et al. | |
| 2004/0026074 A1 * | 2/2004 | Ahner | B60H 1/03 165/202 |
| 2004/0168452 A1 * | 9/2004 | Nakamura | B60H 1/3207 62/228.4 |
| 2005/0066676 A1 * | 3/2005 | Ochiai | B60H 1/3204 62/228.3 |
| 2005/0178132 A1 * | 8/2005 | Sakaguchi | B60H 1/3205 62/181 |
| 2006/0242976 A1 * | 11/2006 | Nakamura | B60H 1/3219 62/228.1 |
| 2006/0275145 A1 * | 12/2006 | Takahashi | B60H 1/3216 417/222.2 |

(Continued)

*Primary Examiner* — Nelson J Nieves

(74) *Attorney, Agent, or Firm* — Vichit Chea; King & Schickli PLLC

(57) ABSTRACT

An externally-controlled variable displacement compressor (EVDC) cold-start method is described including, during an EVDC cold-start procedure, iteratively alternating an amount of a control current supplied to an electronic control valve (ECV) associated with the EVDC between no control current and a full control current. Systems for implementing the described method are provided.

9 Claims, 5 Drawing Sheets

(56) References Cited

U.S. PATENT DOCUMENTS

| | | | |
|---|---|---|---|
| 2007/0084596 A1* | 4/2007 | Umehara | B60H 1/3219 |
| | | | 165/202 |
| 2007/0245754 A1* | 10/2007 | Lee | B60H 1/00971 |
| | | | 62/228.5 |
| 2008/0078542 A1* | 4/2008 | Gering | B60H 1/00278 |
| | | | 165/202 |
| 2008/0134715 A1* | 6/2008 | Lewis | B60H 1/2209 |
| | | | 62/498 |
| 2010/0011788 A1 | 1/2010 | Lifson et al. | |
| 2010/0260619 A1* | 10/2010 | Taguchi | B60H 1/3211 |
| | | | 417/213 |
| 2011/0048042 A1* | 3/2011 | Chen | F25B 9/008 |
| | | | 62/115 |
| 2013/0047639 A1* | 2/2013 | Stannard | B60H 1/3201 |
| | | | 62/79 |
| 2014/0369803 A1 | 12/2014 | Crisp et al. | |
| 2015/0007597 A1 | 1/2015 | Senf, Jr. | |
| 2017/0211561 A1* | 7/2017 | Nakaima | F04B 27/18 |
| 2018/0001744 A1* | 1/2018 | Vehr | B60H 1/3205 |

* cited by examiner

REDUCING EXTERNALLY VARIABLE DISPLACEMENT COMPRESSOR (EVDC) START-UP DELAY

TECHNICAL FIELD

This disclosure relates generally to vehicle cooling and vehicle heating, ventilation, and air conditioning (HVAC) systems. More particularly, the disclosure relates to control strategies for cold-starts of vehicle air-conditioning variable displacement compressors after an extended period of shut off.

BACKGROUND

FIG. 1 depicts certain elements of a refrigerant circuit for a vehicle heating, ventilation, and air conditioning (HVAC) system 100. As is known, such systems include a condenser 102, a drier/receiver 104, one or more evaporators 106, an expansion valve 108, and a compressor 110 which is typically driven by a power source such as the vehicle engine 112. Various conduits 114 inter-connect the described elements for transport of refrigerant, etc. therebetween.

As is known, many compressors 110 in use in modern motor vehicles are variable displacement compressors which provide the advantage of automatically varying their displacement capacities to meet air-conditioning demands, and also offer further advantages of smoother operation and improvements in vehicle fuel consumption compared to the fixed displacement compressors. FIG. 2 illustrates an externally-controlled variable displacement compressor (EVDC) 200 in side cross-section. Specific details of the structure of a variable displacement compressor 200 may vary. However, at a high level such compressors include a housing 202, a suction cavity 203, a suction port 204, a discharge cavity 205, and a discharge port 206. A solenoid 212 is provided to operate a displacement control valve or electronic control valve (ECV) 214 with a high side port 208 and a low side port 210 (this structure is replaced by a bellows in an internally controlled variable displacement compressor, which is otherwise structurally similar to the externally controlled variable displacement compressor 200 described herein). The ECV is operatively connected to a controller generally depicted as reference numeral 213. The controller 213 may also be configured to receive inputs from one or more temperature sensors, for example a sensor associated with the evaporator 106, a temperature sensor associated with an air discharge duct, and an ambient temperature sensor (depicted generally as temperature sensors 215a, 215b, 215c).

A control chamber 216 (also referred to as a crank case) houses a drive shaft 218 carrying a swash plate 220 which is in turn operatively connected to multiple sets of pistons 222. A base plate 224 carried by the drive shaft 218 is in turn operatively connected to the swash plate 220 by a pivot linkage 226. As the drive shaft 218 actuates linearly, the swash plate 220 alternately drives each piston 222 through a stroke cycle, whereby each piston stroke traverses between a minimum and maximum stroke limit. A suction reed valve 228 and a discharge reed valve 230 selectively place the control chamber 216 in fluid communication with, respectively, the suction cavity 203 and the discharge cavity 205 enabling fluid flow in through the suction port 204 and flow out through the discharge port.

Under normal compressor 200 engagement conditions, a bleed hole 232 connecting the control chamber 216 to the suction cavity 203 allows de-pressurization of the control chamber, while building up pressure at the top of the pistons 222 allowing the swash plate 220 to stroke up to maximum angle and leading to cooling performance.

During extended off times at moderate to elevated ambient temperatures, however, the control chamber 216 accumulates fluid (typically a liquid refrigerant and oil mixture) due to refrigerant migration into the relatively cooler compressor from the relatively warmer refrigerant subcomponents, primarily the condenser and the evaporator. On a next engagement or operation of the compressor 200, this fluid must be evacuated through the bleed hole 232 before depressurization of the control chamber 216 can occur and the compressor swash plate 220 can stroke up to enable cooling performance. As a result, a perceptible delay of up to one minute or more is experienced before the air flowing into a vehicle passenger cabin (not shown) is cooled by the evaporator 106. This results in user dissatisfaction.

To solve this and other problems, the present disclosure relates to methods for controlling and improving a variable displacement compressor cold-start which reduce compressor start-up delay, and consequently reduce the time required to provide a cooling airflow to a vehicle passenger cabin.

SUMMARY

In accordance with the purposes and benefits described herein, in one aspect a start-up method is described for an externally-controlled variable displacement compressor (EVDC) of a vehicle heating, ventilation, and air conditioning (HVAC) system comprising, during an EVDC cold-start procedure, iteratively alternating an amount of a control current supplied to an electronic control valve (ECV) associated with the EVDC between no control current and a full control current. The method includes a step of terminating the EVDC cold-start procedure and supplying a full control current to the ECV on determining that an HVAC airflow temperature value has decreased from a starting temperature value as demonstrated by a change in the gradient of the received inputs from one or more temperature sensors, for example a sensor associated with the evaporator 106, a temperature sensor associated with an air discharge duct, and a sensor associated with measuring in-car temperature. In embodiments, the threshold gradient is a predetermined value of 10 degrees of angle. As is known to the skilled artisan, the term "10 degrees of angle" refers to an included angle defined by a plot of a temperature gradient provided by plotting changes in HVAC airflow temperature values over time.

In embodiments, the method includes supplying no control current to the ECV for a predetermined time period on initiation of the EVDC cold start procedure, and subsequently stepping up the control current until the full or maximum control current value is reached. In embodiments, the predetermined time interval is five seconds.

In alternative embodiments, the method includes iteratively supplying a full control current to the ECV for a first time interval and supplying no control current to the ECV for a second time interval during the EVDC cold-start procedure. In embodiments, the first time interval and the second time interval may be the same or different. In one embodiment the first time interval and the second time interval are each ten seconds. In another embodiment the first time interval is ten seconds and the second time interval is five seconds.

In another aspect, a system is described for controlling a cold-start of a vehicle heating, ventilation, and air conditioning (HVAC) system compressor. The system comprises an externally-controlled variable displacement compressor (EVDC) having an electronic control valve (ECV), an HVAC evaporator, and one or more of an HVAC evaporator temperature sensor, a discharge air duct temperature sensor and an in-car temperature sensor. A controller is provided, configured for iteratively causing an amount of a control current supplied to the ECV during an EVDC cold-start procedure to alternate between no control current and a full control current.

The schema applied by the controller for alternating the amount of control current supplied to the ECV during the EVDC cold-start procedure are as described above. In embodiments, the controller is configured to determine the HVAC airflow temperature value from one or more inputs received from one or more of the HVAC evaporator temperature sensor, the discharge air duct temperature sensor and the in-car temperature sensor.

In the following description, there are shown and described embodiments of the disclosed methods for controlling a variable displacement compressor cold-start. As it should be realized, the method is capable of other, different embodiments and its several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed methods for controlling a variable displacement compressor cold-start, and together with the description serve to explain certain principles thereof. In the drawing.

Reference will now be made in detail to embodiments of the disclosed methods for controlling a variable displacement compressor cold-start, examples of which are illustrated in the accompanying drawing figures.

DETAILED DESCRIPTION

Figure 1:
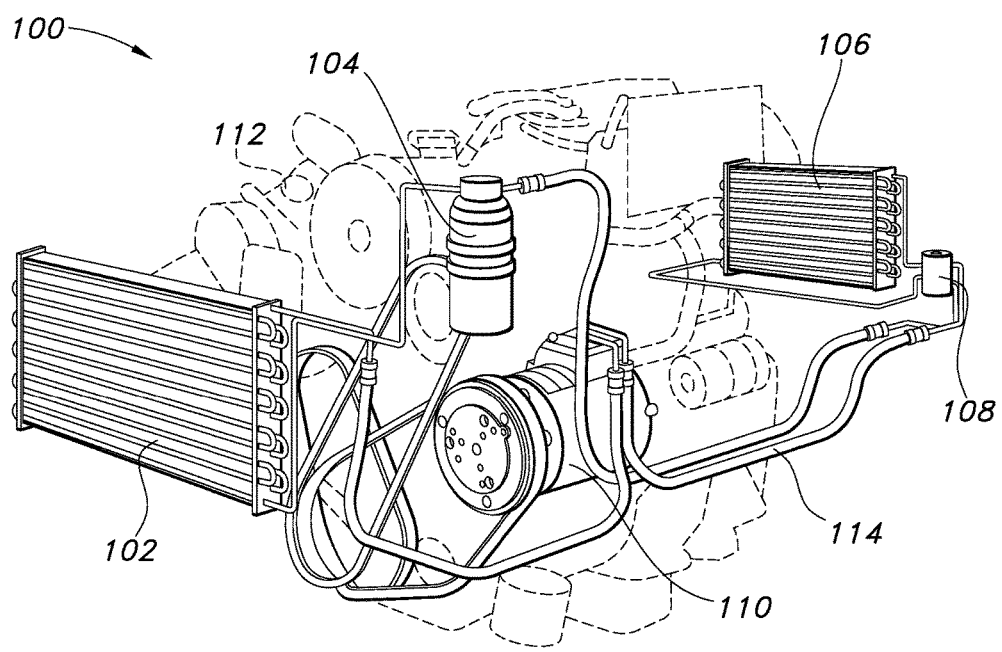
FIG. 1 depicts a prior art vehicle heating, ventilation, and air conditioning (HVAC) system.
Figure 2:
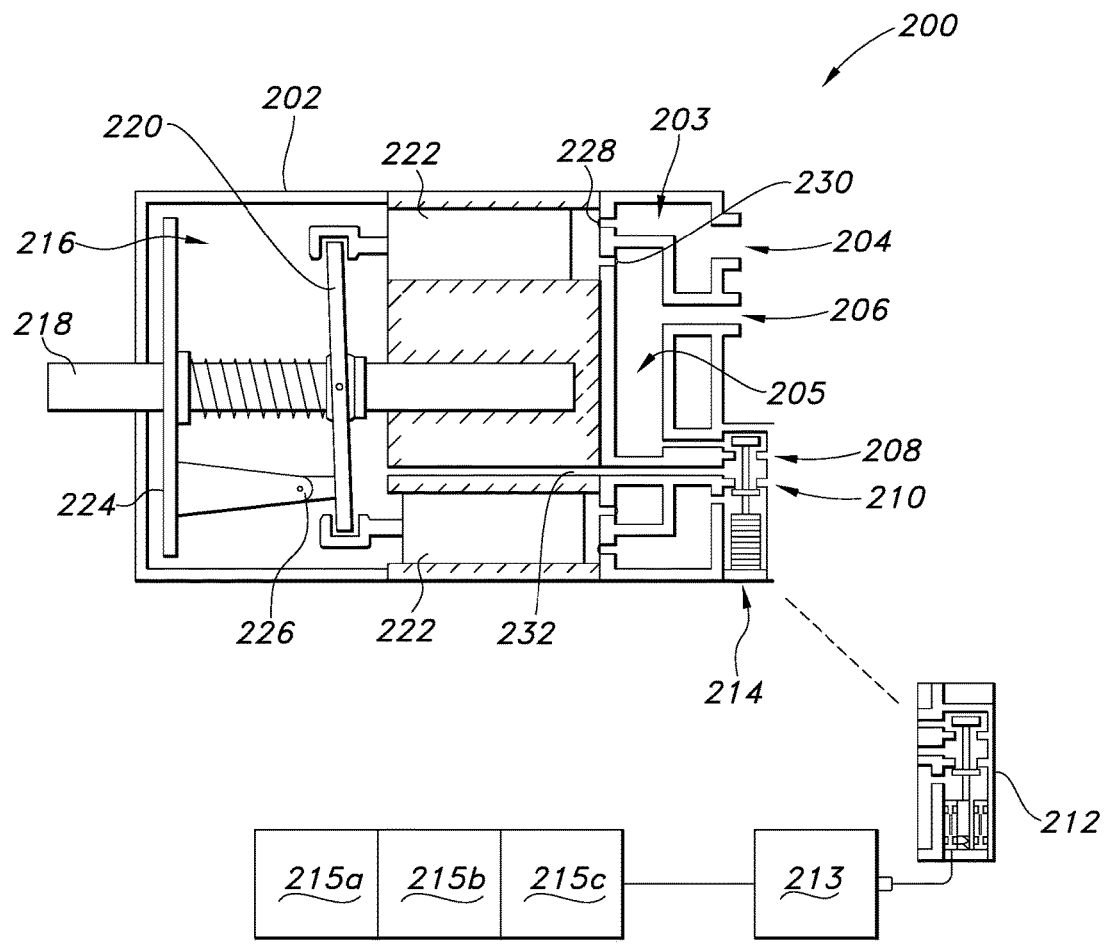
FIG. 2 depicts a side cross-sectional view of a prior art externally controlled variable displacement compressor (EVDC) for use in the system of FIG. 1.
Figure 3:
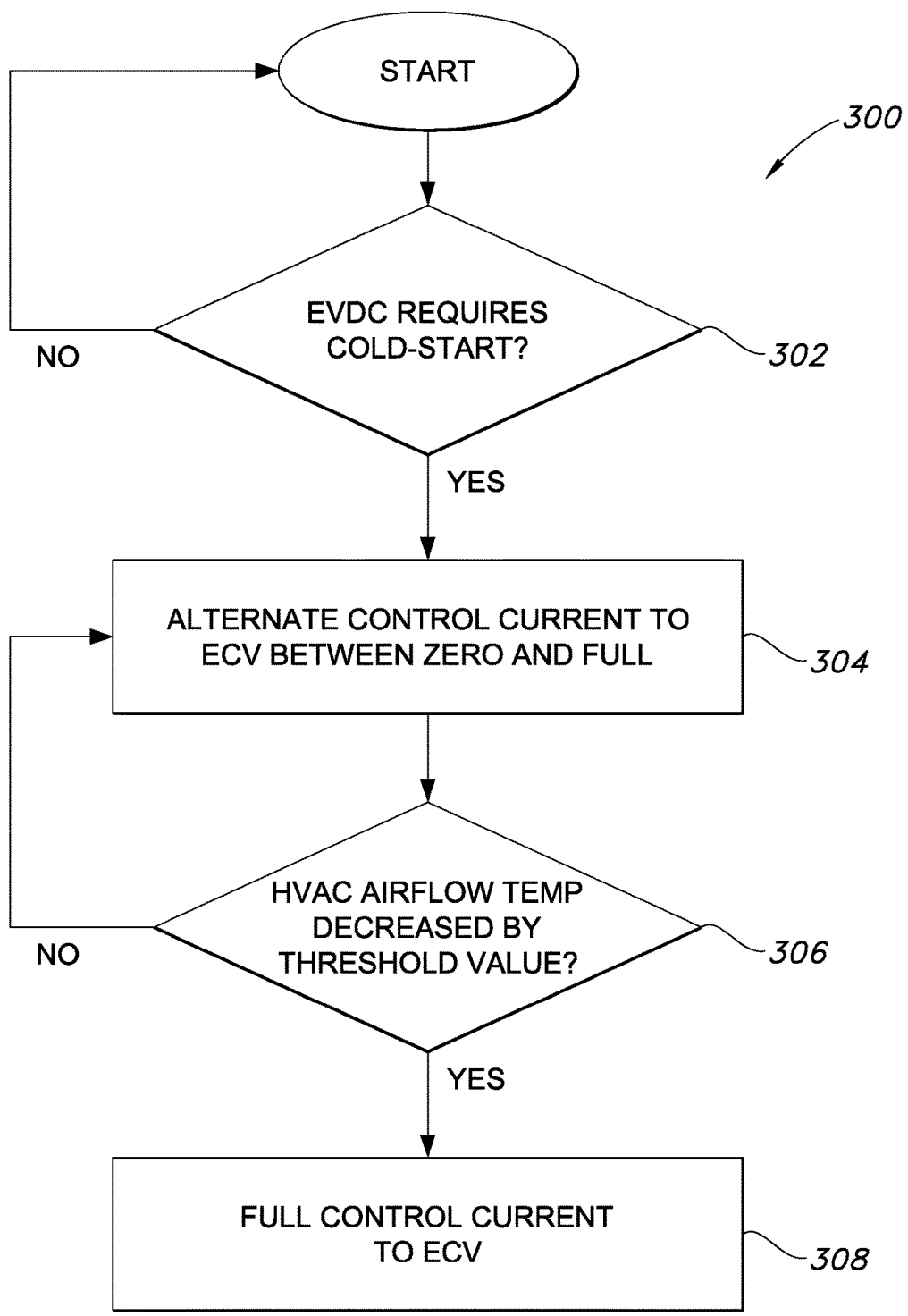
FIG. 3 depicts in flow chart form a method for controlling a variable displacement compressor cold-start.

With reference to FIG. 3, there is shown a method 300 for controlling a cold-start procedure for a variable displacement compressor, for example for an EVDC 200 as described above. At a high level, the method 300 includes steps of iteratively varying a control current supplied to an ECV 212 associated with the EVDC 200 as described above. By a "cold-start," it is meant that the EVDC 200 is to be operated after an extended period of non-use. In one non-limiting example, an extended period of non-use may be defined as 8 hours or more. A cold-start can be identified by observing no change in the gradient of the HVAC airflow temperature as a function of elapsed time, as measured by one or more of the temperature inputs.

At step 302, the controller 213 issues a query to determine if the EVDC 200 has been non-operational for the required period of time and if the cold-start strategy needs to be implemented. This may be done by monitoring the HVAC airflow temperature value and its gradient from one or more inputs received from one or both or all of the HVAC evaporator temperature sensor, the discharge air duct temperature sensor and the in-car temperature sensor as a function of elapsed time. The controller 213 may further consider ambient temperature conditions in determining the need for a cold-start such as when ambient temperatures are moderate to hot (around 20° C. to 45° C.) during the period of EVDC 200 non-operation. This may be done by way of inputs from one or more vehicle ambient temperature sensors 215c as are known in the art. It may also establish cold start strategy needs to be implemented if a predetermined amount of time, around 8 hours, has elapsed since the prior operation of the EVDC.

If so, at step 304 the controller 213 causes the control current supplied to the ECV 212 to alternate between a substantially zero control current and a full control current. In one non-limiting embodiment, this is accomplished by varying the duty cycle of a pulse-width modulated voltage controller feeding the ECV 212. However, alternative methods are known in the art and contemplated for use herein. As will be appreciated, the full control current may vary for particular ECV designs. In one non-limiting example, the control current supplied to the ECV 212 may be alternated between 0 mA and a full control current of 810 mA. However, other operating parameters and specific full control currents for an ECV 212 are contemplated.

At step 306, the controller 213 determines whether an HVAC 100 airflow temperature gradient has decreased by a predetermined threshold value of the gradient. This may be done by inputs provided by suitable temperature sensors, for example an evaporator 106 temperature sensor 215a, an air discharge duct temperature sensor 215b, or an in-car sensor, or a combination thereof. Any suitable temperature gradient decrease may be used to establish the threshold. In one non-limiting embodiment, a temperature gradient decrease of 10 degrees of angle is used as the threshold. However, others are contemplated. If the threshold temperature decrease has not been reached, the controller 213 continues to cause the control current supplied to the ECV 212 to iteratively alternate between zero and full as described above.

If the threshold temperature decrease gradient has been reached, the controller 213 discontinues the cold-start procedure and allows a full control current to be supplied to the ECV 212 (step 308).

Figure 4:
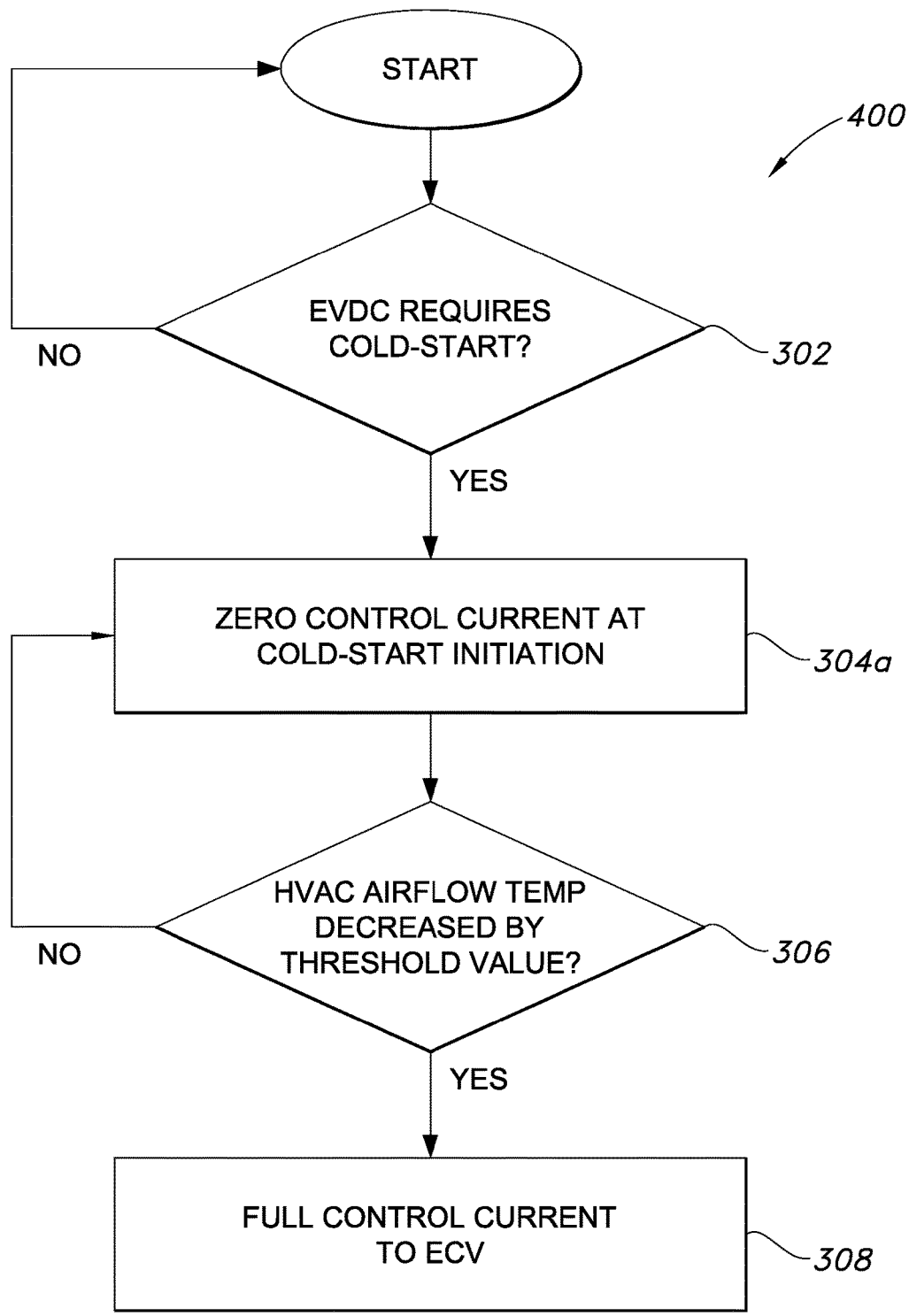
FIG. 4 depicts in flow chart form an alternative embodiment of the method shown in FIG. 3.

Various control schemes are contemplated for implementing step 304 as described above. In one embodiment of a control scheme 400 as shown in FIG. 4, at step 302 the controller 213 determines whether an EVDC 200 cold-start is required as described above. If so, the controller 213 initially allows zero control current at cold-start initiation (step 304a) followed by a determination of whether a threshold temperature decrease gradient has been achieved as described above (step 306). If so, a full control current to the ECV 212 is allowed (step 308). If not, the control current supplied to the ECV 212 is returned to zero by the controller 213 and the process repeats iteratively until the threshold temperature decrease gradient is achieved.

Figure 5:
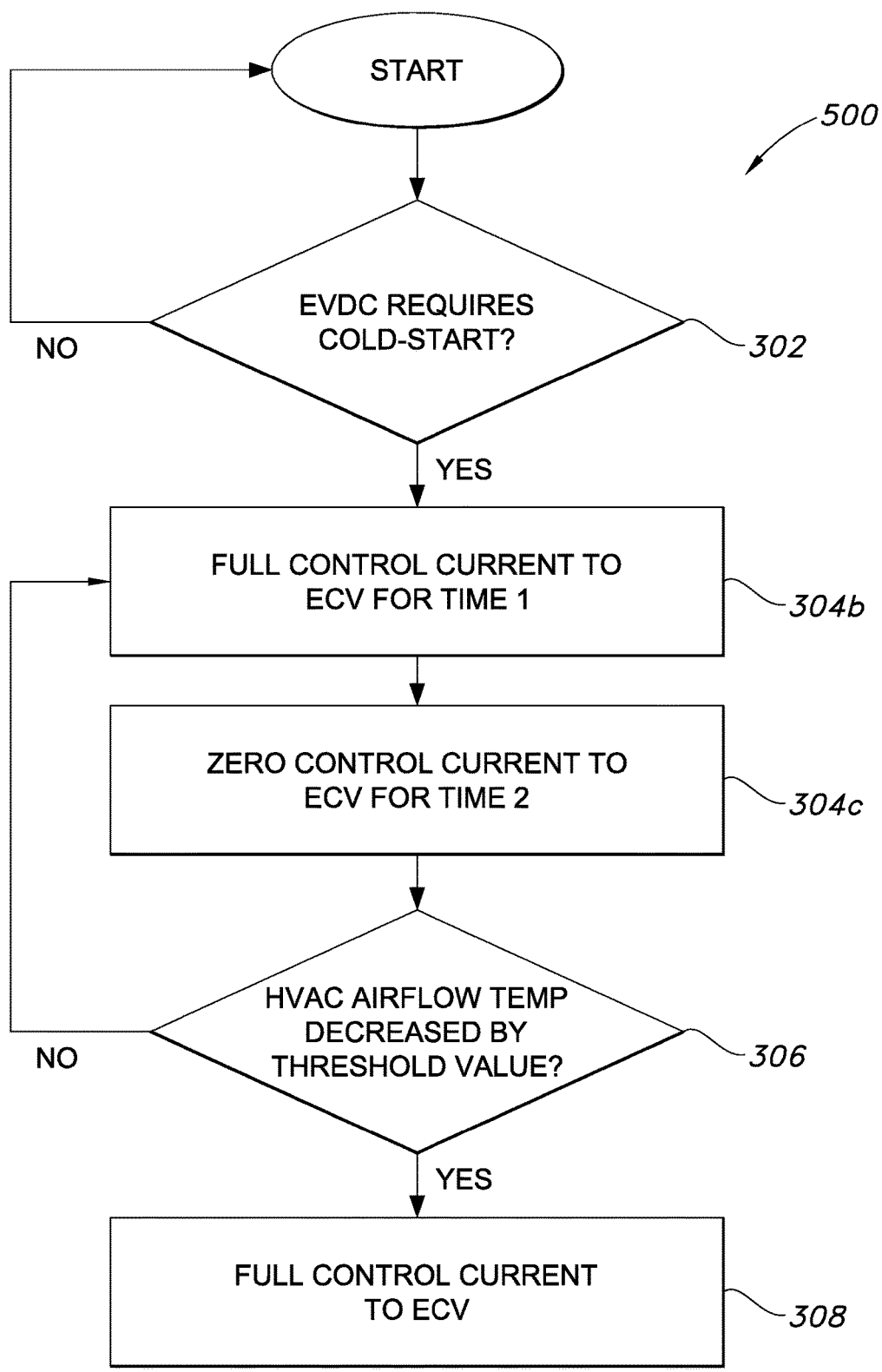
FIG. 5 depicts in flow chart form another alternative embodiment of the method shown in FIG. 3.

In an alternative embodiment of a control scheme 500 as shown in FIG. 5, at step 302 the controller 213 determines whether an EVDC 200 cold-start is required as described above. If so, the controller 213 initially allows full control current at cold-start initiation for a first time period (step 304b), followed by zero control current for a second time period (step 304c). Next is a determination of whether a threshold temperature decrease gradient has been achieved as described above (step 306). If so, a full control current to the ECV 212 is allowed (step 308). If not, the control current supplied to the ECV 212 is returned to full control current (step 304b) by the controller 213 for a next time period followed by zero control current for a next time period, and the process repeats iteratively until the threshold HVAC 100 airflow temperature decrease gradient has been achieved.

It is contemplated that the first time period and the second time period may be the same or different. In one embodiment, the controller 213 allows a full control current to the ECV 212 for a period of 10 seconds, followed by a zero control current for a period of 5 seconds until the desired HVAC 100 airflow temperature decrease gradient has been achieved. In an alternative embodiment, the controller 213 alternates 10 seconds of full control current and 10 seconds of zero control current until the desired HVAC 100 airflow temperature decrease has been achieved.

As will be appreciated, the described methods and systems provide a simple and effective procedure for an EVDC 200 cold-start, without requiring specialized hardware or modification of existing hardware or vehicle components. Obvious modifications and variations are possible in light of the above teachings. All such modifications and variations are within the scope of the appended claims when interpreted in accordance with the breadth to which they are fairly, legally and equitably entitled.

What is claimed:

1. A system for controlling a cold-start of an externally-controlled variable displacement compressor (EVDC) for a vehicle heating, ventilation, and air conditioning (HVAC) system, comprising:
   the EVDC having an electronic control valve (ECV);
   an HVAC evaporator;
   one or more of an HVAC evaporator temperature sensor, a discharge air duct temperature sensor, and an in-car temperature sensor; and
   a controller configured for iteratively causing an amount of a control current supplied to the ECV during an EVDC cold-start procedure to alternate between no control current and a full control current;
   wherein the controller is further configured to terminate the EVDC cold-start procedure and to allow the full control current to the ECV on determining that an HVAC airflow temperature gradient value has decreased by a threshold value.

2. The system of claim 1, wherein the controller is configured to allow supplying the no control current to the ECV for a predetermined time period during the EVDC cold-start procedure.

3. The system of claim 1, wherein the controller is configured to iteratively allow the full control current to the ECV during a first time interval and the control current to the ECV during a second time interval during the EVDC cold-start procedure.

4. The system of claim 3, wherein the first time interval and the second time interval are the same.

5. The system of claim 3, wherein the first time interval and the second time interval are different.

6. The system of claim 4, wherein the first time interval and the second time interval are each ten seconds.

7. The system of claim 5, wherein the first time interval is ten seconds and the second time interval is five seconds.

8. The system of claim 1, wherein the controller is configured to determine the HVAC airflow temperature gradient value from inputs received from the one or more of the HVAC evaporator temperature sensor, the discharge air duct temperature sensor and the in-car temperature sensor.

9. The system of claim 8, wherein the threshold value is a 10 degree angle.

* * * * *